March 3, 1970
V. H. WALDIN
3,498,069
METHOD OF EXTRACTING HEAT FROM ARTICLES
WITH AN EBULLIENT LIQUID FREEZANT
Filed Feb. 19, 1969
3 Sheets-Sheet 1
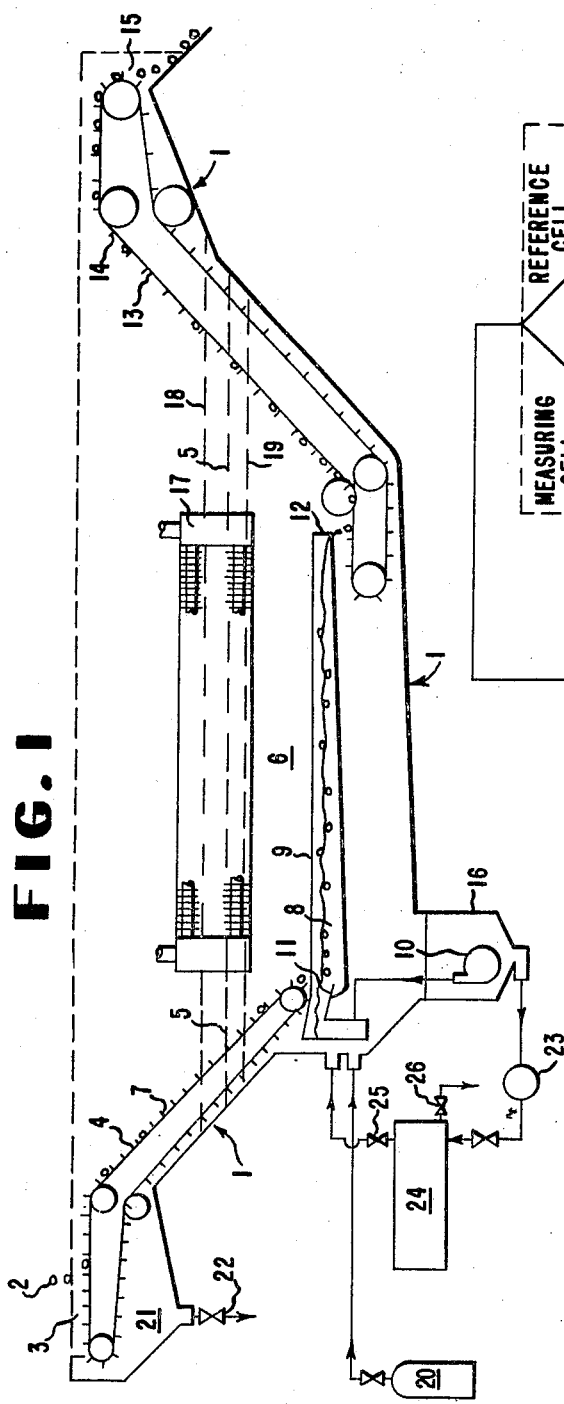
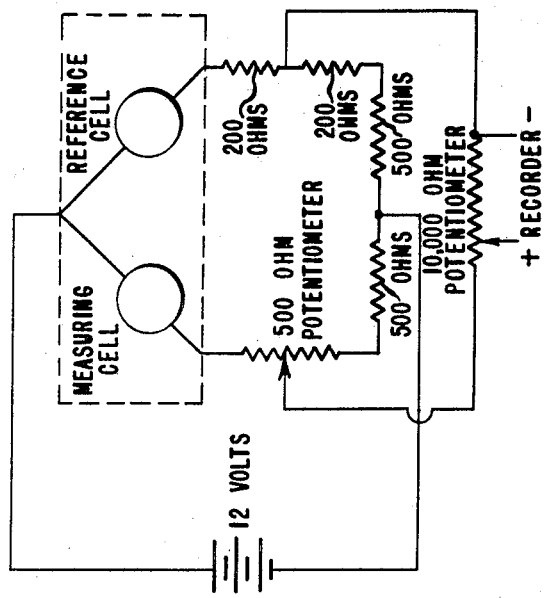
INVENTOR
VINCENT H. WALDIN
BY *Louis W. Pombach*
ATTORNEY March 3, 1970  V. H. WALDIN  3,498,069
METHOD OF EXTRACTING HEAT FROM ARTICLES
WITH AN EBULLIENT LIQUID FREEZANT
Filed Feb. 19, 1969  3 Sheets-Sheet 2
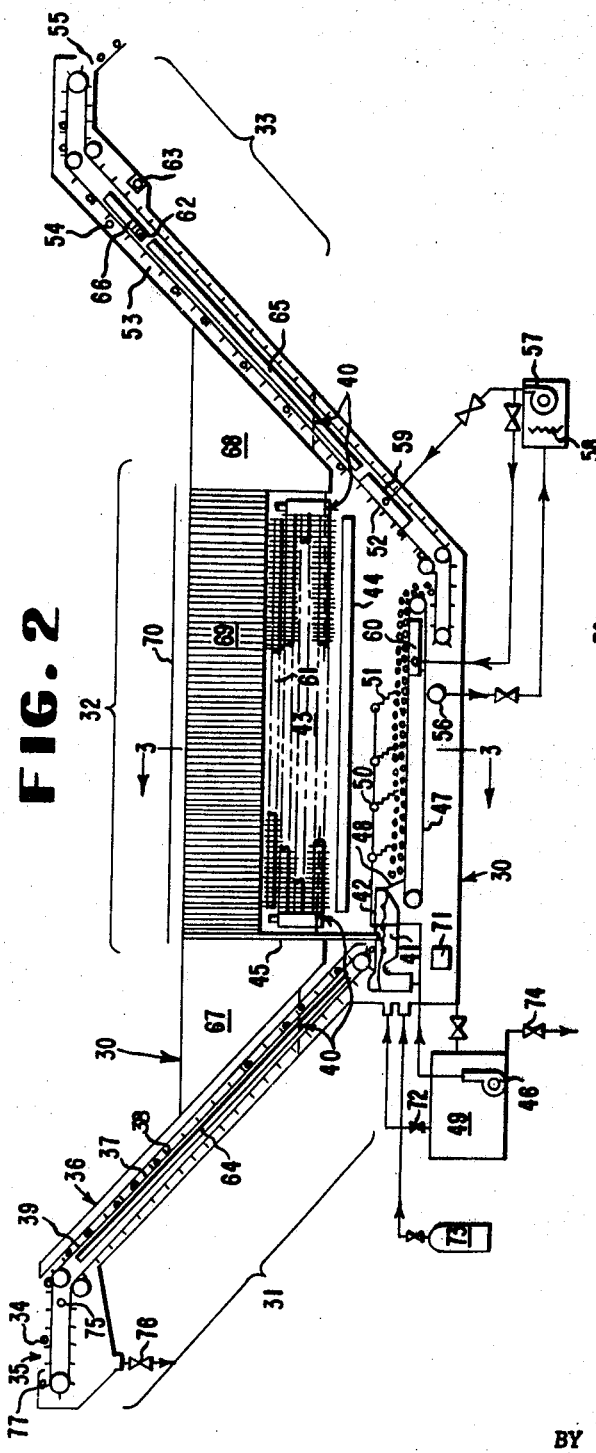
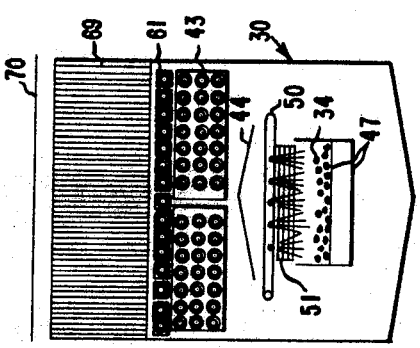
INVENTOR
VINCENT H. WALDIN
BY *Louis W. Lombach*
ATTORNEY

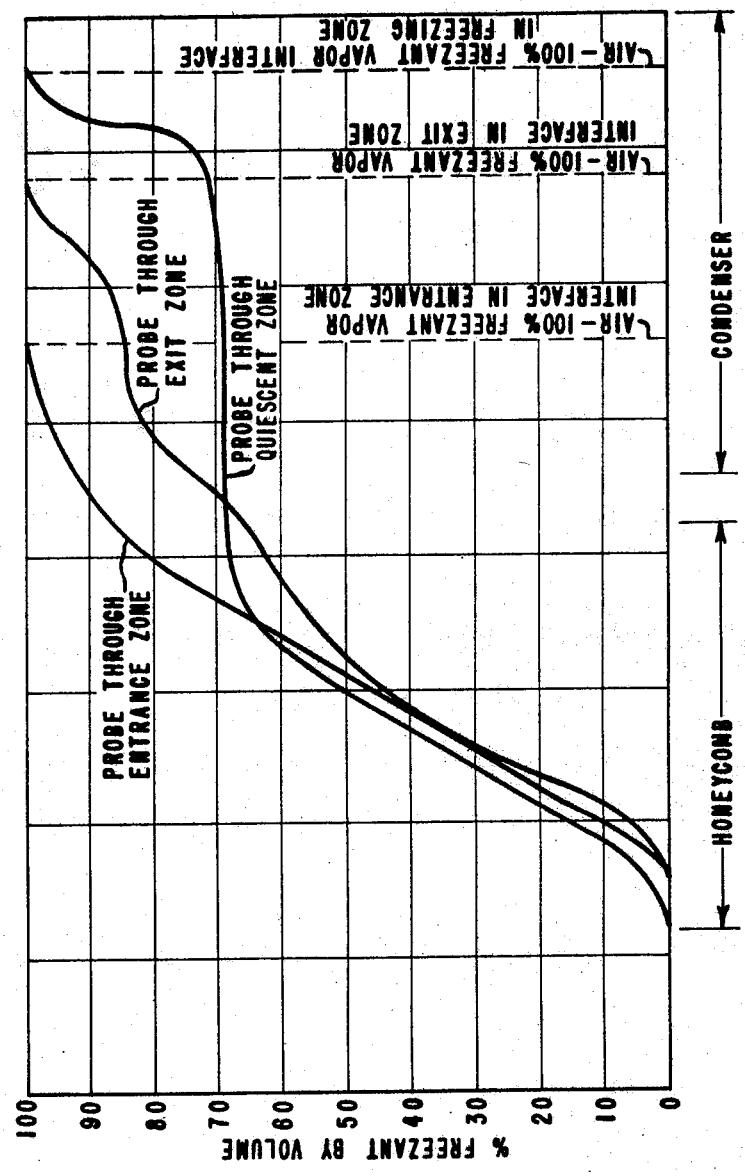

United States Patent Office 3,498,069
Patented Mar. 3, 1970

3,498,069
METHOD OF EXTRACTING HEAT FROM ARTICLES WITH AN EBULLIENT LIQUID FREEZANT
Vincent H. Waldin, Wilmington, Del., assignor to E. I. du Pont de Nemours and Company, Wilmington, Del., a corporation of Delaware
Continuation-in-part of application Ser. No. 725,257, Apr. 19, 1968, which is a continuation-in-part of application Ser. No. 703,393, Feb. 6, 1968. This application Feb. 19, 1969, Ser. No. 800,683
Int. Cl. F25d *13/06;* F25b *49/00*
U.S. Cl. 62—63                                     25 Claims

ABSTRACT OF THE DISCLOSURE

Method of extracting heat from articles, as in the freezing of food, by direct contact with an ebullient liquid freezant in an open vessel without significant loss of freezant vapor to the atmosphere which comprises maintaining by means of a vapor condenser a noncondensable gas-100% freezant vapor interface within the vessel below the level of all paths to the outside atmosphere and above the level at which the articles come in direct contact with the liquid freezant, and introducing the articles into and removing the articles from the vessel without substantially disturbing the noncondensable gas such as air above the interface or introducing essentially any noncondensable gas below the interface.

CROSS-REFERENCE TO RELATED APPLICATIONS

This is a continuation-in-part of copending application Ser. No. 725,257 filed Apr. 19, 1968 which in turn is a continuation-in-part of application Ser. No. 703,393 filed Feb. 6, 1968 and now abandoned.

BACKGROUND OF THE INVENTION

Field of the invention

This invention relates to the extraction of heat from articles, as in the freezing of food, by directly contacting the articles with an ebullient liquid polyfluorinated halohydrocarbon freezant in an open vessel.

Description of the prior art

It is known that food can be satisfactorily frozen by direct contact with an ebullient liquid fluorine-containing halogenated alkane freezant. Robillard, in U.S. Patent 2,059,970, teaches the freezing of food by immersion in such a freezant in a vessel which is open to the atmosphere. The disclosed vessel contains openings through which food is introduced and removed at a level intermediate between a body of liquid freezant and a vapor condenser. The freezing method is predicated upon the assumption that the freezant vapors evolved during immersion of the food in the liquid freezant are lighter than air and thus will rise to the top of the vapor space in the vessel where the vapor condenser is located. However, since the vapors of fluorine-containing halogenated alkane freezants are heavier than air, substantial amounts of these vapors are lost by gravity flow out of the openings. Robillard suggests the use of a freezant having a boiling point of about 50° F. (10° C.), since there is less likelihood of losing much of this freezant through the openings.

In U.S. Patent 3,368,363, Alaburda et al. disclose the freezing of food by immersion in an ebullient liquid fluorine-containing halogenated alkane freezant in a closed freezing vessel containing vapor locks through which the food is introduced and removed. In order to prevent loss of freezant vapor when the locks are open, Alaburda et al. suggest the use of a negative pressure within the freezing vessel which results in the introduction of some air with the food. The freezant vapor evolved during the freezing process and air and water vapor introduced with the food are continuously withdrawn from the freezing chamber, compressed, and cooled, thereby condensing most of the water and freezant vapor. Condensed freezant is returned to the freezing chamber, while air and uncondensed freezant vapor are vented to the atmosphere. In commercial practice using the Alaburda et al. apparatus, it has been found that freezant vapor losses are undesirably high. Moreover, food is frequently damaged during closing of the vapor locks.

Accordingly, there is need in the food freezing industry for a method of directly contacting food with an ebullient liquid freezant in a system which does not result in a significant loss of freezant vapor to the atmosphere, and does not require vapor locks for introducing and removing the food.

SUMMARY OF THE INVENTION

It has now been discovered that heat can be extracted from articles by direct contact with an ebullient liquid freezant in an open vessel without significant loss of freezant vapor to the atmosphere by the process which comprises:

(A) maintaining an ebullient liquid polyfluorinated $C_1$ to $C_4$ saturated halohydrocarbon freezant in the heat extraction zone of an open heat extraction vessel, said freezant having a normal boiling point between about 5° and −50° C. and a vapor density at its normal boiling point at least about twice that of air at the same temperature, (B) maintaining a noncondensable gas-100% freezant vapor interface in the heat extraction vessel by means of a vapor condenser in the heat extraction zone operating at a temperature below the normal boiling point of the liquid freezant, the level of the interface being below the level of all paths to the outside atmosphere which are in free vapor communication with the heat extraction zone, and the level of the interface in the heat extraction zone being above the level at which the articles come in direct contact with the liquid freezant, (C) introducing articles selected from the group consisting of liquids and solids which are at a temperature above the normal boiling point of the liquid freezant into the heat extraction zone without substantially disturbing the noncondensable gas above the interface and without introducing essentially any noncondensable gas below the interface, (D) passing the articles through the heat extraction zone, (E) extracting heat from the articles in the heat extraction zone by direct contact with the liquid freezant, and (F) removing the articles from the vessel through an exit opening without substantially disturbing the noncondensable gas above the interface and without introducing essentially any noncondensable gas below the interface.

The method of this invention can be carried out in heat extraction apparatus which comprises:

(A) an open vessel,
(B) a heat extraction zone within the vessel and containing a liquid freezant having a normal atmospheric boiling point less than ambient temperatures,
(C) vapor condensing means in the heat extraction zone, the top of the vapor condensing means being below the level of all paths to the outside of the apparatus which are in free vapor communication with the heat extraction zone and the size of the vapor condensing means being such as to condense substantially all freezant vaporized in the heat extraction zone,
(D) means for introducing articles into the heat extraction zone,
(E) means for conveying the articles through the heat extraction zone,
(F) means within the heat extraction zone for causing the articles to come in direct contact with the liquid freezant, thereby generating freezant vapor, substantially all of which is condensed by the vapor condensing means,
(G) an exit opening for removing the articles from the vessel, and
(H) means for conveying the articles from the heat extraction zone through the exit opening and out of the vessel.

BRIEF DESCRIPTION OF THE DRAWINGS

FIGURE 1 is a schematic elevation of a simple heat extraction vessel which embodies the novel concepts of the present invention.

FIGURE 2 is a schematic elevation of a preferred heat extraction vessel for carrying out the present invention.

FIGURE 3 is a schematic elevation of the heat extraction vessel of FIGURE 2 taken along the line 3—3 of FIGURE 2.

FIGURE 4 is a circuit diagram for a thermal conductivity analyzer which is suitable for determining the level of the air-100% freezant vapor interface in a heat extraction vessel of this invention.

FIGURE 5 is a graph of a typical freezant vapor concentration gradient in a heat extraction vessel of this invention.

DESCRIPTION OF THE INVENTION

The articles

In accordance with the heat extraction method of this invention, heat can be extracted from any liquid or solid article. Although it is expected that the method of this invention will be used primarily for extracting heat from solid food, it is also useful in a wide variety of other applications, involving the cooling or freezing of liquids, semi-solids or solids.

The term "articles" is intended to include two or more discrete particles of a single solid commodity, for example, two or more peas, or two or more packages such as boxes or pouches containing food, as well as a continuous flow of a liquid or semi-solid commodity. The size of the articles is not important so long as it is coordinated with the size of the heat extraction vessel, that is, the articles will pass through the vessel.

Most commonly the process of this invention will be used for the freezing of solid food. Solid foods which can be satisfactorily frozen in accordance with this invention include vegetables, such as potatoes, peas, lima beans, green beans, corn, beets, carrots, asparagus, celery, avocados, eggplant, green peppers, radishes, tomatoes and mushrooms; fruits, such as strawberries, blueberries, raspberries, apples, apricots, peaches, plums, cantaloupe, grapefruit, pineapple, cherries and grapes; meats, such as beef, pork, veal, lamb and fowl; and seafood, such as scallops, shrimp, fish, and the like.

These foods may be frozen in their natural form, if desired. Large articles of food, such as corn on the cob, whole chickens, sides of beef and the like, are readily frozen in accordance with this invention. On the other hand, it is desirable in many cases to freeze foods in smaller particle sizes. Large fruits and vegetables may be sliced, diced, or cut into balls. The larger fruits, such as apples, apricots, peaches, plums and the like, may be peeled, pitted, and prepared in final portions ready for consumption, for example, in halves, quarters or smaller pieces. Berries are preferably graded, stemmed, washed, and placed in suitable condition for consumption and then immediately frozen. Chunks of meat or seafood may be cut into pieces of suitable size and shape, such as cubes, sticks, patties and the like, and then coated with appropriate materials such as bread crumbs, flour, corn meal and the like, if desired, before freezing.

The process of this invention is also useful in the freezing of aqueous liquids and semi-solids. Suitable liquids include fruit and vegetable juices such as orange juice, soup, broth, whole blood, aqueous pharmaceutical preparations and the like. Suitable semi-solids include mashed fruits and vegetables such as apple sauce and mashed potatoes, pastry dough, soup and the like. The process is also useful for cooling non-aqueous liquids such as pharmaceutical tinctures and non-aqueous solids such as metal parts which are to be assembled with other parts having close tolerances.

In accordance with this invention, the articles enter the vessel at a temperature above the normal boiling point of the freezant. Under normal circumstances, the articles will enter the vessel at or above the temperature of the ambient atmosphere which is usually well above the normal boiling point of the freezant.

The freezants

The heat extracting agents used in accordance with this invention extract heat from articles by direct contact with the article, thereby changing the physical state of the heat extracting agent from liquid to vapor. The terms "heat extraction" and "heat extracting" are meant to include both the chilling of articles which may or may not contain water, and the freezing of articles which contain water, including most foods. For convenience, the heat extracting agents are referred to as "freezants."

The freezants which are suitable for use in accordance with this invention are ebullient liquid polyfluorinated $C_1$ to $C_4$ saturated halohydrocarbons. The term "polyfluorinated halohydrocarbon" is intended to include halogen-substituted hydrocarbons containing at least two fluorine atoms. Thus, the term includes hydrocarbons in which two or more of the hydrogens are substituted by halogen. The hydrocarbon may be an alkane or a cycloalkane.

The freezants used in accordance with this invention must have normal boiling points, that is, boiling points at atmospheric pressure, between about 5° C. and −50° C. With freezants boiling above about 5° C., the chilling of articles is extremely slow. When using freezants boiling below about −50° C. the freezing of articles such as food may result in undesirable cracking. Moreover, recovery of a freezant having a boiling point below about −50 °C. imposes the need for a refrigeration system more elaborate than those ordinarily used in conventional food freezing plants, thus adding to the freezing cost of such a system without any corresponding advantage. Preferably, the freezant has a normal boiling point between about −20° C. and −40° C. Because these freezants have normal boiling points below the temperature of both the articles being introduced and the ambient atmosphere, they are ebullient during use.

The freezants used in accordance with this invention must also have vapor densities at their normal boiling points at least about two that of air at the same temperature. The process of this invention is predicated upon, and uses to advantage, the greater density of the freezant vapor as compared with air. Preferably, the freezant has a vapor density at its normal boiling point at least about three times that of air at the same temperature.

Polyfluorinated $C_1$ to $C_4$ saturated halohydrocarbons having the combination of boiling point and vapor density falling within the above defined limits are listed in Table 1.

TABLE 1

| Freezants | Boiling point °C. | Vapor density at boil. pt./ air density at same temp. | Liquid boil. pt., g./cc. |
| --- | --- | --- | --- |
| 1,2-dichlorotetrafluorethane | +3.8 | 6.14 | 1.52 |
| Octafluorocyclobutane | −5.8 | 7.28 | 1.61 |
| 1,1-difluoroethane | −24.7 | 2.35 | 1.01 |
| Dichlorodifluoromethane | −29.8 | 4.36 | 1.49 |
| Chloropentrafluoroethane | −38.7 | 5.55 | 1.55 |
| Chlorodifluoromethane | −40.8 | 3.10 | 1.41 |

The liquid densities of the freezants at their boiling points are also given in Table 1. As can be seen from the densities, the freezants, with the possible exception of 1,1-difluoroethane, are all denser than food, which generally has a density of about 1.1±0.1 g./cc. Accordingly, food will generally float on the surface of the freezant, which property can be used to advantage during the heat extraction process.

Mixtures of these compounds with themselves and with other compounds also provide suitable freezants so long as the mixture has a boiling point and a vapor density within the above defined limits. Qualified mixtures provide a means of obtaining temperatures not obtainable with single component freezants. Azeotropic mixtures, that is, mixtures which yield vapors of the same composition as the liquid, are particularly suitable. The properties of useful azeotropic mixtures are given in Table 2.

TABLE 2

| Azeotropic freezant mixtures | | Boiling point, °C. | Vapor Density at boil. pt./ air density at same temp. | Liquid density at boil. pt., g./cc. |
| --- | --- | --- | --- | --- |
| Components | Weight, percent | | | |
| Dichlorodifluoromentane | 25 | −41 | 3.28 | 1.44 |
| Chlorodifluoromentnae | 75 | | | |
| Do | 49 | −47 | 3.89 | 1.50 |
| Chloropentafluoroethane | 51 | | | |
| Dichlorodifluoromethane | 74 | −33 | 3.59 | 1.33 |
| 1,1-difluoroethane | 26 | | | |

Although freezant mixtures which are not azeotropic may also be used, they are more difficult to handle since the vapors lost to the atmosphere during operation of the system will have a higher concentration of the more volatile component than the liquid freezant mixture. In order to maintain the desired boiling point of the original liquid freezant in the heat extraction vessel when using such a freezant mixture, it is necessary that the make-up freezant mixture have a higher concentration of the more volatile component than the original liquid freezant.

The heat extraction system

When operating in accordance with the basic principles of this invention, heat can be extracted from articles by direct contact with an ebullient liquid freezant in an open vessel without significant loss of freezant vapor to the atmosphere. By "open vessel" is meant a vessel which is open to the atmosphere, that is, contains at least one opening which allows free vapor communication between the heat extraction zone and the outside atmosphere, thus maintaining said zone essentially in pressure equilibrium with the atmosphere. Freezant losses generally do not exceed about 5 lbs. of freezant per 100 lbs. of articles passed through the system. Under the preferred conditions, freezant losses do not exceed about .2 lbs. per 100 lbs. of articles.

The most important concept of the present invention is the maintenance of a noncondensable gas-100% freezant vapor interface at a level below the level of all paths to the outside atmosphere which are in free vapor communication with the heat extraction zone and at a level above that at which the articles come in direct contact with the liquid freezant. By the "level" of a path to the outside atmosphere is meant the highest level to which freezant vapor must rise in order to pass from the heat extraction zone to the outside atmosphere. Most commonly the path to the outside atmosphere is an outside opening in the vessel.

By "noncondensable gas" is meant a gas which is not condensable under the conditions present at the surface of the vapor condenser. Such noncondensable gas should have a density not more than one-half that of the freezant vapor at the same temperature. Under normal operation, the noncondensable gas is air which, by definition of the freezant, has the required density. In the term "noncondensable gas-100% freezant vapor interface" the noncondensable gas layer is a layer containing any detectable amount of noncondensable gas using the thermal conductivity analyzer illustrated in FIGURE 4. When the probe of the analyzer is passed downward slowly into the heat extraction vessel, the interface is the highest level at which 100% freezant vapor is detected. Similarly, when the probe is passed upward from the bottom of the heat extraction vessel, the interface is the lowest level at which the presence of noncondensable gas is detected. Since the noncondensable gas is normally air, it will be referred to as air in the further discussion of this invention.

Under idling conditions, that is, after equilibrium has been established with no article being introduced, the air above the interface contains freezant vapor in a concentration gradient which decreases from 100% at the interface to zero percent at the level of a path to the outside atmosphere. This gradient is caused by molecular diffusion of the heavier freezant vapor from the interface into the lighter air above and by circulation of the air above the interface due to thermal convection. Under operating conditions, further turbulence in the area of the interface, particularly in the air above the interface, causes additional mixing of freezant vapor with the air above the interface, thus further increasing the amount of freezant vapor in this air.

Because the movement of freezant vapor in the upward direction, as reflected by small freezant vapor losses through outside openings in the upper region of the vessel, is generally faster than the rate at which air diffuses and mixes downward into the 100% freezant vapor layer below the interface, air makes no net gain in movement downward with respect to the interface. As a result, it has been found that an air-100% freezant vapor interface can be maintained in the heat extraction vessel in accordance with this invention.

The level of the air-100% freezant vapor interface is generally not the same throughout the vessel. For example, the level of the interface in the area of the vapor condensed will tend to be lower than the level outside this area. Similarly, when the vessel is subdivided into zones, such as when entrance and exit passageways are present, the level of the interface in the heat extraction zone tends to be below the level of the interface in the entrance and exit zones. These differences in level result from differences in temperature and resistance to vapor flow in the various zones.

The temperature at any level in the vessel is not necessarily the same in all zones. Since the vapor condenser is physically located in the heat extraction zone, the temperature in this zone tends to be somewhat lower than the temperature in the entrance and exit zones. The extent to which this difference in temperature exits will be affected by the degree of isolation between the zones, that is, whether entrance and exit passageways are present. The temperature in the entrance zone is further increased by the comparatively warm articles being introduced through it.

Due to the effect of temperature on the density of gases, the warmer gases in the entrance and exit zones will be substantially less dense than the gases in the heat extraction zone. The density of gases at 10–20° C., for example, is only about 80% of the density of the same gases at a typical vapor condenser temperature of −43° C. Since the more dense gases in the heat extraction zone have a higher static pressure head than the less dense gases in the entrance and exit zones, the interface level in the heat extraction zone tends to be lower than in the warmer zones.

The resistance to vapor flow offered by the heat exchange surfaces of the vapor condenser also contributes to the level of the interface in the heat extraction zone being below the level of the interface in the entrance and exit zones. In order to overcome this resistance, the level of the interface outside the area of the vapor condenser tends to rise above the level of the interface within the area of the vapor condenser.

The level of the air-100% freezant vapor interface should be maintained below the level of all paths to the outside atmosphere which are in free vapor communication with the heat extraction zone. Maintenance of the interface below this level avoids the loss of gross amounts of freezant vapor to the atmosphere, as would be the case if the interface were at or above the level of a path to the outside atmosphere. Since the level of the interface is not necessarily the same throughout the heat extraction vessel, the level of the interface used for comparison with the level of any path to the outside atmosphere as specified above should be the level of the interface adjacent to that path.

The level of the air-100% freezant vapor interface in the heat extraction zone should be maintained above the level at which the articles come in direct contact with the liquid freezant. If the interface were maintained below the level of the direct contact, the freezant vapors evolved during heat extraction would cause turbulence in the air above the interface and would mix with the air. Maintenance of the interface above the level of the heat extraction avoids this source of mixing of freezant vapor with air.

The distance of the interface above the level of the direct contact is relatively unimportant provided it is sufficient that the evolved freezant vapors do not substantially disturb the interface. On the other hand, an excessive distance between the interface and the level of the direct contact serves no useful purpose while increasing the cost of operation due to the increased volume of freezant vapor within the vessel and the increased length of the entrance and exit conveyors.

The level of the interface is maintained by means of a vapor condenser in the heat extraction zone operating at a temperature below the normal boiling point of the liquid freezant. The vapor condenser is conveniently located in the vapor space of the heat extraction zone although it is not necessarily limited to this position. In order to maintain the interface below the level of all paths to the outside atmosphere which are in free vapor communication with the heat extraction zone, the top of the condenser is preferably located below the level of all such paths. Although it is possible for some of the condensing capacity to be located below the level at which the articles come in direct contact with the liquid freezant without causing the interface to drop below the level of the direct contact, it is generally more convenient to have the bottom of the vapor condenser located above the level at which the articles come in direct contact with the liquid freezant.

The configuration of the vapor condenser is important, but the optimum configuration will vary depending upon the amount of fluctuation in the feed load. Under steady load conditions, that is conditions which do not cause the interface to rise or fall, the most advantageous configuration is a tall, thin condenser which allows a reduction in the area of the interface, thereby reducing diffusion. However, under non-steady load conditions, that is, conditions which cause the interface to rise and fall, the most advantageous configuration is a condenser which is as short in the vertical plane and as long and wide in the horizontal plane as practical. This arrangement reduces the vertical distance through which the interface rises and falls during operation of the system. Reducing this vertical distance reduces the speed at which the interface moves as it responds to variations in the operating conditions of the system, with a resulting decrease in the amount of mixing above the interface. Thus, the configuration of the vapor condenser is generally a compromise between steady and non-steady load considerations. The vapor condenser can be a single unit of suitable size or a combination of two or more units.

In operating the open heat extraction system of this invention, freezant vapor losses can be reduced by maintaining the volume of air above the air-100% freezant vapor interface as nearly static as possible. Turbulence in this volume of air disturbs the interface with the result that additional quantities of freezant vapor mix with air beyond the amount already present because of diffusion and thermal convection.

Mixing of freezant vapor and air can be reduced by minimizing the turbulence caused by introducing and removing articles from the vessel. Articles should be introduced into the heat extraction zone without substantially disturbing the air above the interface and without introducing substantially any air below the interface. Articles should also be removed from the vessel without substantially disturbing the air above the interface.

One suitable method of introducing the articles is through an entrance opening which is in free vapor communication with the heat extraction zone. After the articles have been introduced, they are passed downward from the entrance opening through the interface and into the heat extraction zone. Free communication between the outside atmosphere and the heat extraction zone is important because it allows the freezant vapor to displace the air surrounding the articles as they pass through the interface without substantially disturbing the interface or introducing essentially any air below the interface.

Turbulence is minimized during introduction of the articles through the entrance opening by passing them slowly from the entrance opening to the interface. Suitable speeds will vary depending upon the size and shape of the articles being introduced. Generally it is preferred that the articles move from the entrance opening to the interface at a speed not in excess of 100 feet (30.48 meters) per minute. Most preferably the articles are passed from the entrance opening to the interface at a speed of less than 50 feet (15.24 meters) per minute. Preferably there is also no tumbling motion which would create turbulence.

The articles are preferably passed through an entrance passageway from the entrance opening to the interface. The purpose of the entrance passageway is to somewhat limit the open area in the entrance zone, thereby reducing convection currents and the volume of air pushed out of the entrance opening under non-steady load conditions. The passageway also tends to reduce the effect of ambient air currents. This passageway however, should not restrict free vapor communication between the heat extraction zone and the entrance opening.

A number of conveying means may be used to convey the articles from the entrance opening to the heat extraction zone. Suitable conveyors for handling solid articles include belt conveyors, such as wire mesh and other foraminous belts and impervious belts, auger type conveyors, short stroke vibratory conveyors, and the like. The conveyors should be chosen so as to minimize turbulence in the air above the air-100% freezant vapor interface and to allow free communication between the outside atmosphere and the heat extraction zone. Liquid articles can be introduced through the entrance opening, for example, by running down a trough or duct from which they drip into a freezant bath. After the liquid is frozen, it can be handled as a solid. Liquids which are to be chilled rather than frozen are most readily handled by first sealing them in a container.

Another method of introducing the articles into the heat extraction zone which is suitable for liquids and semi-solids is to pump them in below the interface through a pipe which is not open to the atmosphere. When introducing articles in this way, it is important that the pipe be filled with a continuous stream of the articles whereby essentially no air or other noncondensable gas is introduced below the interface. Introduction of air below the interface would cause mixing of air and freezant vapor. Any conventional pump used for food handling can be used for the more fluid articles and suitable extrusion devices can be used for semi-solids such as pastry dough.

After the articles have passed through the heat extraction zone they can be removed from the vessel by passing them upward through the interface and out of the vessel through an exit opening which is in free vapor communication with the heat extraction zone. Turbulence is minimized during the removal of the articles by passing them upward slowly from the interface to the exit opening. Preferably, the articles are passed upward at the same rates specified for passing them from the entrance opening to the interface. In passing upward the freezant vapor is replaced with air. The conveyors used to remove the articles from the vessel can be any of those mentioned as being suitable for passing solid articles from the entrance opening to the heat extraction zone. Further analogous to the preveiously described methods of introducing articles into the vessel, articles can be removed from the heat extraction zone and/or the vessel by any means which neither substantially disturbs the noncondensable gas above the interface nor introduces essentially any noncondensable gas below the interface. For example, it has been disclosed that liquids and semi-solids which are to be frozen can be introduced below the interface through a pipe which is not open to the atmosphere. Similarly, articles can be removed from the heat extraction zone and/or the vessel through a pipe. In this case the liquid or semi-solid which provides the seal between the inside of the vessel and the outside atmosphere need not be the articles being treated. Any suitable liquid or semi-solid can be employed to provide the seal, with the treated articles being removed from the heat extraction zone and/or the vessel in or through the liquid or semi-solid.

Freezant vapor losses to the atmosphere can also be reduced by increasing the distance between the interface and the outside openings, thereby providing a longer path for freezant vapors escaping by diffusion. The extent to which this vertical dimension is increased will depend upon economic considerations.

Since the amount of freezant vapor moving from the interface into the air above the interface is a function of the area of the interface, freezant vapor losses also tend to be reduced by reducing the horizontal cross-sectional area of the vapor space within the vessel. This can be accomplished by filling, or otherwise closing off, all unnecessary vapor space which is traversed by the interface. Since it is necessary that the vapor condenser cover a rather large horizontal area within the heat extraction zone, the minimum horizontal cross-sectional area of the vapor space within the heat extraction zone is generally determined by the area occupied by the vapor condenser.

Freezant vapor losses can also be reduced by stabilizing the level of the air-100% freezant vapor interface. If this interface is constantly rising and falling, increased mixing of air and freezant vapor will result. Also, as the interface rises, air, which may contain relatively large quantities of freezant vapor, is pushed out of the vessel through the outside openings. The level of the interface can be stabilized by feeding the articles into the vessel at a constant rate.

Freezant vapor losses can also be reduced by decreasing the effect of ambient air currents on the air above the interface in the vessel. This decrease can be accomplished by providing a top cover for the heat extraction vessel containing the minimum area of outside opening necessary for proper functioning of the system. Under steady load conditions, the smaller the area of the outside opening, the smaller will be losses by diffusion through the opening. On the other hand, when operating under non-steady load conditions, it is preferable that the area of the opening be large enough that atmospheric air, passing down through the opening as the interface falls, does not enter at a velocity which causes a substantial amount of turbulence in the air above the interface.

In order to provide a substantially open freezing vessel which allows equalization of pressure under non-steady load conditions, while at the same time avoiding the turbulence caused by thermal convection and ambient air currents, it is preferred that there be above the heat extraction zone a quiescent zone containing a quiescent body of air which moves substantially only in response to the vertical movement of the interface, and which has above it a path to the outside atmosphere such as an outside opening which is in free vapor communication with the heat extraction zone through the quiescent zone. By "substantially only in response to the vertical movement of the interface," it is meant that there is no substantial movement of air within the quiescent zone due to thermal convection or ambient air currents, the only substantial movement of air being in the vertical direction and substantially in response to the rising and falling of the interface.

When the quiescent zone is of sufficient volume, it has the effect of allowing the system to tolerate substantial variations in the rate at which articles are introduced without markedly increasing freezant vapor losses. A large quiescent zone provides a reservoir of air in its lower region which rises and falls with the interface, but never passes through the outside opening. Because of the substantial absence of mixing in the quiescent zone, the air in the upper region of the zone, which passes through the outside opening above the zone when the interface rises, contains a relatively low concentration of freezant vapor.

In order to increase this stabilizing effect, it is preferable that the quiescent body of air in the quiescent zone have a volume at least about half the volume of the vapor space in the heat extraction zone between the lowest interface level during operation with no articles being passed through the heat extraction zone and the highest interface level during operation with a maximum rated amount of articles being passed through the heat extraction zone. Most preferably, the quiescent body of air should have a volume at least about equal to the volume of the vapor space in the heat extraction zone between these two levels. When the quiescent body of air is of this size an added benefit results. It is sufficiently large that when the interface falls from its highest level to its lowest level, the air from the outside atmosphere which is drawn into the quiescent zone never reaches the heat exchange surfaces of the vapor condenser. Thus, even when the outside atmosphere is humid, excessive frosting of the condenser is avoided.

The area of the opening above the quiescent zone is not important provided it is sufficiently large that significant pressure differences do not occur across the opening. Such differences in pressure would cause outside air to pass through the opening at high velocity thereby causing turbulence. Preferably the area of the opening above the quiescent zone is at least about $1/100$ of the horizontal cross-sectional area of the vapor space in the quiescent zone.

A variety of quiescing means are available which will suppress thermal convection and ambient air currents in the quiescent zone, while allowing the body of air to move in response to the vertical movement of the interface. The quiescing means should also allow free vapor communication between the heat extraction zone and the outside atmosphere. Suitable means include appropriate baffles, loosely packed material such as glass wool fibers, and honeycomb structures. It is preferable that the quiescing means limit the general direction of flow in the quiescent zone to the vertical direction without causing any substantial change in velocity or direction as the air moves through the quiescent zone, since these changes tend to cause turbulence. Accordingly, the preferred means for creating quiescence is a vertically standing honeycomb structure which resembles a series of closely packed, relatively small diameter, parallel tubes standing in the vertical direction. Generally the volume of the quiescent zone is defined by the volume within which the quiescing means are present.

Since the level of the interface in the entrance and exit zones tends to be higher than the level of the interface in the heat extraction zone, freezant vapor losses can be further reduced by elevating the level of the entrance and exit paths so that they are at least as high as the level of the path to the outside atmosphere above the quiescent zone. In other words, it is preferable that the level of the path to the outside atmosphere above the quiescent zone not be above the level of the lowest other path to the outside atmosphere which is in free vapor communication with the heat extraction zone. It is even more preferable that the level of the entrance and exit paths be elevated so that the distance from the level of the path to the outside atmosphere above the quiescent zone to the interface in the heat extraction zone is less than the distance from the level of the lowest other path to the outside atmosphere which is in free vapor communication with the heat extraction zone to the interface in the zone containing said lowest other path.

In their broadest aspects, the basic principles of this invention can be practiced in a vessel containing a single outside opening. This single opening could result from there being no top cover on the vessel or a top cover containing a single outside opening. The single opening could be an exit opening when the articles are introduced into the heat extraction zone through a pipe, or it could be an opening through which articles are both introduced and removed.

When solid food is frozen in a covered vessel, it is preferred that there be at least two outside openings, one for introducing the food and the other for removing the food. Because food generally has a substantial moisture content, it is not desirable to pass food into and out of the vessel through the same opening. Otherwise the water vapor surrounding the food being introduced would tend to condense on the frozen food being removed. This results in the formation of a layer of frost on the frozen food which is undesirable.

When the heat extraction vessel contains a quiescent zone, it is preferable that there be at least two outside openings. It is impractical to use the opening above the quiescent zone for introducing or removing articles because of interference wtih the quiescing means. Preferably there are no more than three outside openings since additional openings tend to increase freezant vapor losses to the atmosphere.

The process of this invention does not depend upon any particular method of directly contacting the articles with the liquid freezant. The articles can be contacted, for example, by immersion in a bath of liquid freezant, by being sprayed with liquid freezant, and the like. The heat extraction can be carried out either by continuously contacting the article with the liquid freezant until the desired amount of heat has been removed, or by an interrupted freezing technique in which the article is first contacted with the liquid freezant until only a portion of the desired amount of heat is removed, and then removed from contact with the freezant thereby allowing the icy shell to cold-flow and relieve internal stresses before contact with the liquid freezant is resumed.

The particular manner in which the food is passed through the heat extraction zone is of no importance to the present invention. Suitable means of moving articles through the heat extraction zone include a stream of liquid freezant, a gas jet moving across the surface of a body of liquid freezant, a mechanical auger, a foraminous belt, and the like. When the first contact between solid food and liquid freezant is to be on a belt conveyor, the conveyor should have a minimum area of contact with the food so that sticking of the food to the conveyor by freezing is minimized. A suitable conveyor for this purpose would be a wire mesh conveyor having needle point contact with the food. Wire mesh conveyors having a nonstick coating such as polytetrafluoroethylene may also be suitable.

DETAILED DESCRIPTION OF THE DRAWINGS

In order to illustrate specific embodiments of the method of this invention, the apparatus of FIGURES 1, 2 and 3 will be described in terms of their use for freezing solid food. Referring now to FIGURE 1, the food freezing apparatus is enclosed by elongated heat extraction or freezing vessel 1, which has insulated walls. Since freezing vessel 1 does not have a top cover, the open top constitutes a single large outside opening which serves as both the entrance and the exit opening. Food particles 2 are introduced into vessel 1 at entrance area 3 and carried by entrance conveyor 4 from the entrance area downward through air-100% freezant vapor interface 5 into heat extraction or freezing zone 6. The entrance conveyor is of wire mesh construction and has cleats 7 of a height and spacing suitable for the food being handled.

The food particles free-fall into a body of liquid freezant 8 contained in quick freezing pan 9. The food particles free-falling from conveyor 4 generally dip down under the surface of the liquid freezant. This results in rapid formation of a frozen crust or shell on the food particles. The particles then rise and float on the surface of the liquid freezant which has a density greater than that of the food. The vigorous boiling action of the freezant, as it is vaporized by the heat extracted, separates the food particles which might otherwise freeze together as they pass down into the freezant. Once the frozen crust is formed on the surface of the food particles, they no longer tend to adhere to one another. The rapid formation of the frozen crust also assures that natural fluids and additives are not lost from the food particles.

The depth of the liquid in pan 9 must be sufficient that food particles free-falling from the conveyor do not contact the bottom of the pan. Liquid freezant is supplied to pan 9 by adjustable circulating pump 10. A steady flow at the surface of the freezant in the pan is caused by baffle 11, thereby insuring rapid movement of food out of the free-fall area toward spill point 12 without recirculation in any part of the pan. By adjusting the length of time the food remains in the pan, the desired degree of freezing can be achieved.

The flow of fluid freezant from pan 9 sweeps the food onto exit conveyor 13 which is also of wire mesh construction and is wider and has higher cleats 14 than entrance conveyor 4, but is otherwise similar. Because the frozen food can now be stacked without sticking together, exit conveyor 13 travels more slowly than entrance conveyor 4. As the frozen food is conveyed upward through air-100% freezant vapor interface 5 toward exit area 15, the heavy freezant vapor in the interstices of the food particles is replaced by air and flows downward toward the freezing zone. Liquid freezant which drains through the exit conveyor collects in sump 16.

Freezant vapor evolved in freezing pan 9, or elsewhere, is condensed by parallel finned tube bundle vapor condenser 17. The condenser is the evaporator of a standard refrigeration system using ammonia or a fluorocarbon refrigerant and produces a suitable surface temperature for condensing the freezant vapors. Alternatively, conductive heat extraction mediums such as brine operating below the normal boiling point of the liquid freezant could be used in suitable vapor condensers. Dry Ice could also be used in direct contact with the freezant vapors or could be separated from the vapor by a heat conducting wall.

Freezant liquid condensed by vapor condenser 17 falls into quick freezing pan 9 and/or runs into sump 16. As the rate at which freezant vapor is evolved varies with the rate at which food is introduced, the level of interface 5 rises and falls. During operation with a maximum rated amount of food being passed through the vessel, the interface is about ⅔ of the way up the height of the condenser as illustrated at level 18. The portion of the condenser above level 18 provides excess condensing surface for surges, upsets, and maldistribution of vapor. Under idling conditions in which no food is being passed through the vessel, the interface is just above the bottom of the condenser as illustrated at level 19.

When the freezing operation is first started up, air is displaced from the freezing zone by freezant vapor entering vessel 1 from any convenient source such as bulk storage tank or shipping cylinder 20 before vapor condenser 17 is cooled to the operating temperature. In this manner moist air is removed from the area of the condenser without the formation of frost on the heat exchange surfaces. When the freezant vapor level reaches the top of vapor condenser 17, the temperature of the condenser is lowered to below the boiling point of the liquid freezant. Freezant can now be introduced into the vessel as liquid or vapor, preferably as liquid. The freezing of food can be commenced when the air-100% freezant vapor interface reaches level 19 and sufficient liquid freezant is present to establish liquid flow through pump 10 and freezing pan 9. Any excess water or other liquid introduced with the food in entrance area 3 passes through entrance conveyor 4 into area 21 and is discharged through valve 22.

For servicing the equipment or at the end of a freezing operation, freezant is removed from the freezing vessel by drain pump 23. The freezant is pumped into storage vessel 24 which is sized to hold as a liquid all of the freezant normally in the freezing vessel and is designed to withstand the pressure resulting from the storage vessel and its contents reaching the ambient temperature in the operating area. Storage vessel 24 may be above or below the bottom of the freezing vessel.

When a freezing operation is resumed after an extended shutdown, air is displaced from the freezing zone by freezant vapor passing from storage vessel 24 through valve 25 before vapor condenser 17 is cooled to the operating temperature. When the freezant vapor level reaches the top of vapor condenser 17 the temperature of the condenser is lowered below the boiling point of the liquid freezant. Liquid freezant can now be introduced into the freezing vessel from storage tank 20. After freezing has been commenced, make-up freezant can be supplied as vapor from vessel 24 until it is empty. When all the liquid freezant in vessel 24 has been vaporized, any sludge or residue remaining in the vessel may be removed through drain valve 26. Make-up freezant is then supplied as liquid from storage tank 20, as required. The aforesaid sludge or residue remaining in vessel 24 is of two types, namely, that which is soluble in freezant and that which is insoluble. If desired the latter may be removed from the freezant between the time it leaves sump 16 and enters vessel 24. For example, a coarse filter may be installed between pump 23 and vessel 24 to remove filterable solids.

Referring now to FIGURES 2 and 3, the preferred food freezing apparatus comprises insulated freezing vessel 30 which contains entrance zone 31, freezing zone 32 and exit zone 33. Food particles 34 are introduced through entrance opening 35 and carried downward into entrance passageway 36 by entrance conveyor 37 which has cleats 38.

Optionally, entrance conveyor cover 39, which is a sheet of flexible plastic or other suitable material weighted at the lower end, may be used to ride above the cleats thereby preventing tumbling of food particles down the conveyor. Space is provided in passageway 36 above the conveyor cover to allow it to rise above irregular food particles or clumps of particles. With some food, such as sliced peaches, the cleats may be omitted, in which case the cover alone prevents tumbling.

Food particles pass downward through air-100% freezant vapor interface 40 and free-fall into a body of liquid freezant 41 in quick freezing pan 42. Freezant vapor evolved from freezing pan 42, or elsewhere, is condensed by parallel finned tube bundle primary vapor condenser 43. Roof shaped baffle 44 collects condensate from the condenser and diverts it to either side of the vessel so that condensate does not drip on the articles on the process conveyor.

The freezing of high moisture content foods, especially when they have been cut or sliced, or the immediate freezing of foods which have been blanched or otherwise treated with aqueous brines, as is commonly practiced, may result in a high moisture intake into the freezing vessel. The vapor of the preferred freezant, dichlorodifluoromethane, forms a crystalline or semi-solid hydrate in the presence of water vapor at temperatures between about 0° C. and 7° C. If this hydrate forms on the food during the freezing process, then during thawing it may impart an unattractive frothy appearance to the food resulting from decomposition of the hydrate to dichlorodifluoromethane vapor and water. Therefore, it is desirable to minimize hydrate formation.

Intermingling of freezant vapor and water vapor carried in with the food is localized by vapor partition 45 which maintains a relatively static atmosphere of air, water vapor and freezant vapor around the entrance conveyor. The partition is adjusted to be as near to the surface of liquid freezant 41 as possible without seriously restricting vapor communication between the food free-fall area of freezing pan 42 and the remaining portion of the freezing zone. Partition 45 sufficiently isolates entrance zone 31 from the cooling effect of vapor condenser 43 that the critical hydrate forming temperature of 7° C. or lower is not reached by the food until it is free-falling into freezing pan 42. Hydrate formation essentially ceases when the icy crust is formed on the food since the surface temperature is below 0° C. Accordingly, the food is within the hydrate forming temperature range for such a short period of time that very little hydrate forms. In the case of freezants other than dichlorodifluoromethane, the distance of free-fall, position of partition 45 etc., can be adjusted to quickly pass the food through the hydrate forming temperature range.

Fouling of condenser 43 by ice or hydrate will reduce the efficiency of the condenser and may limit the length of operation by making it necessary to shut down periodically for servicing. If desired, the condenser may be divided into sections, some of which may be heated by internal hot gas flow for removal of ice or hydrate while the other sections continue in service. Some of the sections may also be taken out of service during periods of idling operation.

Steady surface flow of liquid freezant in pan 42, supplied by adjustable circulating pump 46, insures rapid movement out of the free-fall area toward the spill point. The surface velocity across the pan should preferably sweep the food out of the pan in from 2 to 10 seconds. Pan 42 is adjustable, by means not shown, so that the surface velocity and liquid depth at the spill point can be varied independently. During the time food remains in the pan, the surface of the food is frozen to form an icy crust of sufficient hardness to permit stacking the food several layers deep on conveyor 47. The flow of freezant liquid in pan 42 sweeps the food onto sloping ramp 48 which communicates with process conveyor 47. This conveyor is also of wire mesh or other foraminous construction but has no cleats. Ramp 48, which contains small holes to allow freezant to pass through, distributes the food from pan 42 more uniformly across the process conveyor. Freezant liquid which drains through ramp 48 and process conveyor 47 collects in storage vessel 49.

After liquid freezant has been withheld from contact with the food on conveyor 47 for a time sufficient to permit the food to partially equilibrate, but not thaw the surface sufficiently to cause the particles to adhere to adjacent particles, it is contacted with a stream of liquid freezant flooding from above. Liquid freezant from storage vessel 49 in delivered by circulating pump 46 to distributors 50 which are movable by means not shown and which flood the food on the process conveyor with a stream of liquid freezant at selected locations.

As shown in FIGURE 3, liquid freezant distributors 50 are pipes arranged at right angles to the conveyor movement which contain large widely spaced orifices. These distributors flood the food along a line perpendicular to the direction in which the food is moving. Preferably the flooding is by a continuous stream of liquid. The stream of liquid may be formed in any suitable manner such as by means of a sloping corrugated plate 51 attached to each distributor 50 which causes the liquid freezant to spread into a relatively uniform sheet before it contacts the food particles. Further contact between the liquid freezant and the food is withheld after removal of the desired amount of heat.

Process conveyor 47 transfers the food particles to discharge conveyor 52 which is wider and has higher cleats but otherwise is similar to entrance conveyor 37. As the food is transferred from one conveyor to the other, it tumbles thereby spilling out any liquid freezant which may have been trapped in crevices or surface depressions in the food. As the frozen food is carried upward by conveyor 52 beyond interface 40, heavy freezant vapor drains out of the interstices of the food and is replaced by air. Optionally, the freezant vapor may be replaced by dry, filtered air introduced into the exit conveyor passageway 53 through port 54. This dry air also minimizes accumulation of atmospheric moisture as ice on the conveyor and on the food. The food, now substantially free freezant, passes out of the freezing vessel through exit opening 55.

Freezant concentration on the frozen food can be further reduced by purging the food with heated freezant vapor thereby vaporizing any freezant liquid clinging to the food. Optionally, freezant vapor may be withdrawn from the freezing zone through port 56 by blower 57, heated by heater 58, and passed through the food on the conveyor using a purge chamber. The purge chamber may be located at 59 near the lower end of discharge conveyor 52 or alternatively near the discharge end of process conveyor 47 as shown at 60, or at both locations. The heated freezant vapor should be at a temperature below 0° C., but at least about 5° C. above the normal boiling point of the freezant. Liquid freezants having a normal boiling point of about −10° C. to −50° C. are preferred when this purging is employed.

Optionally, secondary or stripper vapor condensers 61, 62 and 63, operating at substantially lower temperatures than primary vapor condenser 43, may be located above the primary condenser and near the top of exit passage 53 to condense additional freezant vapor. These secondary condensers preferably are finned tubes.

Optionally, the spaces between the countercurrent flights of the conveyors may be filled by sections of closed-cell foamed insulating material or other impervious barriers as shown at 64, 65 and 66 to minimize the mixing of air and freezant vapor in the entrance and exit passages. Space above the passageways and adjacent to primary and secondary condensers 43 and 61 and honeycomb structure 69 are filled by sections of closed-cell insulating material or other impervious barriers as shown at 67 and 68.

Loss of freezant vapors from the vapor space above the primary condenser is minimized by retarding thermal convection and ambient air currents in this area. Phenolic resin impregnaed paper honeycomb structure 69 is installed above the entire condenser area to create a quiescent zone. Dust cover 70, located above the top of honeycomb structure 69, is provided to reduce entry of air-borne dirt but not restrict breathing in the honeycomb passages.

For servicing the equipment during or at the end of a freezing operation, optional pump down condenser 71 may be located near the bottom of the freezing vessel to assure maximum freezing recovery and may be connected to the refrigeration systems of either the primary or secondary vapor condenser 43 or 61. Liquid freezant collected in the bottom of the freezing vessel passes into storage vessel 49 which can contain a vapor condenser or can be designed to withstand the pressure resulting from the freezant reaching room temperature.

When operation is resumed, freezant vapor is returned to the freezing vessel through valve 72 and primary condenser 43 is cooled to operating temperature. Freezing of food can be resumed when sufficient freezant has been accumulated to establish liquid flow through freezing pan 42 and freezant distributors 50. Make-up freezant as liquid or vapor is supplied from storage tank 73 as required.

In order to provide additional flexibility when starting a new freezing run on a different food from the previous run, a clean-up tank, not shown, can be connected to storage vessel 49 and the bottom of freezing vessel 30. In this case the freezant from the previous run is collected in the clean-up tank, after which any sludge or residue remaining in storage vessel 49 is removed through drain valve 74. Again, as in the description of FIGURE 1, solids may be removed from the liquid freezant by means of a suitable filtration device. With valve 72 closed, fresh freezant is supplied from storage tank 73. With drain valve 74 closed, condensed freezant from freezing vessel 30 is passed into clean storage vessel 49 and pump 46 is operated. Make-up freezant vapor is supplied to the freezing vessel from the clean-up tank until the liquid freezant in this tank has been depleted. The clean-up tank is then ready to be cleaned and make-up freezant is again supplied from storage tank 73. A suitable skimmer can also be incorporated into the clean-up system to remove floating debris from the liquid freezant.

All parts of the freezing apparatus which come in contact with the food should be made of materials capable of being cleaned by methods normally used for cleaning food handling equipment. Entrance conveyor 37 may be cleaned during operation whenever ice or food debris accumulates on the conveyor belt. A suitable detergent solution is sprayed on the return flight of the conveyor by spray manifold 75 thereby dislodging debris and is drained from the housing through valve 76. Air manifold 77 may be used to blow air through the conveyor belt thereby removing water from the belt before food is placed on it.

The following examples, illustrating the novel heat extraction process of this invention, are given without any intention that the invention be limited thereto.

Example 1

In this example, freezing apparatus which is designed to freeze about 500 lbs. (226.7 kg.) of food per hour, is used to freeze peas, lima beans, diced carrots and strawberries using dichlorodifluoromethane as the liquid freezant. The apparatus is similar to that illustrated in FIGURE 2 except that no secondary condensers 61, 62 and 63, no freezant vapor purge chambers 59 and 60, no dry air introduction through port 54 and no pump down condenser 71 are present and the entrance and exit openings are only slightly elevated above the top of the honeycomb structure.

The food freezing vessel extends for less than 20 feet (6.1 m.) from the point of food entry to the frozen food exit and is approximately 2 feet (61 cm.) wide. The top of the entrance and exit passageways are approximately 6 feet (1.83 m.) above the floor and the level of the paths to the outside atmosphere at the entrance and exit openings are approximately 5.3 feet (1.68 m.) above the floor. Food entrance conveyor 37 is a wire mesh belt about 11.25 in. (28.6 cm.) wide with cross cleats 0.5 in. (1.27 cm.) high by 10 in. (25.4 cm.) long, spaced 2 in. (5.1 cm.) apart. The conveyor carries the food particles downward into the air-100% freezant vapor interface in entrance passageway 36 at an angle of 45° for about 55 in. (139.7 cm.) at a speed of about 60 in. (152.4 cm.) per minute, and allows the food to free-fall about 6 in. (15.2 cm.) into a flowing stream of liquid freezant 41.

The freezant liquid depth in freezing pan 42 is about 2.5 in. (6.4 cm.). The freezant liquid surface velocity is about 5 in. (12.7 cm.) per second. The distance from the free-fall area to the spill point at the end of the freezing pan is about 15 in. (38.1 cm.). The spill point is about 4 in. (10.2 cm.) above process conveyor 47. The bottom of partition 45 is 1 in. (2.54 cm.) above the freezant liquid surface in pan 42.

Process conveyor 47 is a wire mesh belt about 13.25 in. (33.7 cm.) wide with no cross cleats which extends for about 76 in. (193 cm.) through the freezing zone of the freezing vessel. The speed of the process conveyor is about 16 in. (40.7 cm.) per minute. The food on the process conveyor is about 1.8 feet (54.9 cm.) above the floor. Freezant liquid from distributors 50 is flooded over the food particles piled in multiple layers on the process conveyor at selected locations to complete freezing without cracking.

Food from the process conveyor is tumbled as it is delivered to exit conveyor 52, a wire mesh belt about 15.25 in. (38.7 cm.) wide with cross cleats 1.1 in. (2.8 cm.) high and 15 in. (35.6 cm.) long, spaced 3 in. (7.6 cm.) apart. The exit conveyor carries the food upward through the freezant vapor in the exit zone at an angle of 45° for about 76 in. (193.1 cm.) at a speed of about 20 in. (50.8 cm.) per minute. The frozen food drops from the exit conveyor into an exit chute for transfer to storage.

Vapor condenser 43, containing approximately 800 sq. ft. (74.4 sq. m.) of heat exchange surface, is constructed of 75 horizontal, parallel, aluminum finned, carbon steel tubes exposed to freezant vapor for about 70 in. (177.8 cm.) between tube sheets. The tube outside diameter is ⅞ in. (22.2 mm.) with a wall thickness of 0.083 in. (2.1 mm) and fins of 1.75 in. (4.5 cm.) diameter spaced ⅙ in. (4.2 mm.) apart. The tubes are spaced 3.5 in. (8.9 cm.) apart vertically in each of 15 rows spaced 1.2 in. (3.1 cm.) apart horizontally with alternate rows set 1.75 in. (4.5 cm.) higher for unrestricted freezant vapor flow. The condenser is divided into three separately piped sections mounted side by side. The vapor condenser is operated at a surface temperature of about −43° C. The vertical dimension of honeycomb structure 69 is about 15 in. (38.1 cm.). The hexagonal passages are 0.375 in. (9.5 mm.) across flats. The top of the honeycomb passages is 5.5 ft. (1.68 m.) above the floor.

Three freezant liquid distributors 50 are constructed of stainless steel tubing 1 in. (2.54 cm.) outside diameter by 0.87 in. (22.1 mm.) inside diameter with corrugated plates 51 set 50° from the vertical and extending 4.3 in. (10.9 cm.). Liquid freezant, pumped at low pressure through five drilled holes, 0.18 in. (4.6 mm.) in diameter, spaced 2.5 in. (6.4 cm.) apart along the tubes, flows from plates 51 in a uniform sheet for flooding food particles on process conveyor 47 with freezant liquid as desired. The bottoms of the plates are about 10 in. (25.4 cm.) above process conveyor 47.

All of the frozen food obtained in these freezing operations is attractive in appearance, free from cracks, and ready for storage or packaging in individual free-flowing particle form. The loss of freezant during these freezing operations average about 2 lbs. per 100 lbs. of food frozen.

Example 2

A vapor composition profile of the gases in the freezing apparatus described in Example 1 is obtained using the thermal conductivity analyzer illustrated in FIGURE 4. The measurements are made during continuous operation in which 6,000 lbs. (2722 kg.) of cut green beans have been frozen while feeding the beans at the rate of 430 lbs. (195 kg.) per hour.

The analyzer is basically a Wheatstone bridge having the resistance values indicated in the drawing. The measuring and reference cells are part of a "Gow-Mac microcell" having 8,000 ohm thermistors as sensing elements. The reference cell contains air and is sealed at both ends. A probe comprising a length of ⅛ in. (3.18 mm.) inside diameter copper tubing is connected to the measuring side of the microcell. A small vacuum pump is also connected to the measuring cell to draw sample vapor from the desired sample point in the freezing vessel through the measuring cell at the rate of about 5 cc. per minute. The recorder is a Bausch and Lomb variable range recorder.

The analyzer is calibrated by first drawing 100% air through the probe and setting the recorder to read zero microvolts by adjustment of the 500 ohm zero set potentiometer. The probe is then inserted into a 100% dichlorodifluoromethane vapor atmosphere and the recorder is set at 100 microvolts using the 10,000 ohm range potentiometer. The recorder dial now reads percent by volume dichlorodifluoromethane vapor in air. The probe is then inserted downward in a vertical direction through the honeycomb structure in the quiescent zone of the freezing vessel and readings are taken approximately every two inches (5.08 cm.) until the 100% freezant vapor level is reached. In a similar manner the probe is inserted through the entrance and exit passageways. The data obtained are plotted in the graphs of FIGURE 5.

Example 3

Freezing apparatus similar to that illustrated in FIGURE 1 and designed for freezing 500 lbs. (226.7 kg.) of food per hour is used to freeze peas, lima beans, diced carrots and strawberries with dichlorodifluoromethane as the freezant. Equivalent parts of the freezing apparatus are the same size as the corresponding parts of the freezing apparatus of Example 1, except that the entrance and exit areas are not elevated and the freezing pan is considerably longer. Only the parts illustrated in FIGURE 1 are present. The loss of freezant during these freezing operations averages about 3.5 lbs. per 100 lbs. of food frozen.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. A method of extracting heat from articles by direct contact with an ebullient liquid freezant in an open vessel without significant loss of freezant vapor to the atmosphere which comprises:

(A) maintaining an ebullient liquid polyfluorinated $C_1$ to $C_4$ saturated halohydrocarbon freezant in the heat extraction zone of an open heat extraction vessel, said freezant having a normal boiling point between 5° C. and —50° C. and a vapor density at its normal boiling point at least twice that of air at the same temperature, (B) maintaining a noncondensable gas-100% freezant vapor interface in the heat extraction vessel by means of a vapor condenser in the heat extraction zone operating at a temperature below the normal boiling point of the liquid freezant, the level of the interface being below the level of all paths to the outside atmosphere which are in free vapor communication with the heat extraction zone, and the level of the interface in the heat extraction zone being above the level at which the articles come in direct contact with the liquid freezant, (C) introducing articles selected from the group consisting of liquids and solids which are at a temperature above the normal boiling point of the liquid freezant into the heat extraction zone without substantially disturbing the noncondensable gas above the interface and without introducing essentially any noncondensable gas below the interface.

(D) passing the articles through the heat extraction zone, (E) extracting heat from the articles in the heat extraction zone by direct contact with the liquid freezant, and (F) removing the articles from the vessel through an exit opening without substantially disturbing the noncondensable gas above the interface and without introducing essentially any noncondensable gas below the interface.

2. The method of claim 1 in which the freezant is dichlorodifluoromethane.

3. The method of claim 1 in which the heat is extracted from the articles by an interrupted freezing technique.

4. The method of claim 1 in which the noncondensable gas is air and the level of the interface is below the level of all outside openings which are in free vapor communication with the heat extraction zone.

5. The method of claim 1 in which the top of the vapor condenser in the heat extraction zone is below the level of all paths to the outside atmosphere which are in free vapor communication with the heat extraction zone.

6. The method of claim 5 which also comprises maintaining above the heat extraction zone a quiescent zone containing a quiescent body of noncondensable gas which moves substantially only in response to the vertical movement of the interface, said quiescent zone having above it a path to the outside atmosphere which is in free vapor communication with the heat extraction zone through the quiescent zone.

7. The method of claim 6 in which the quiescent body of noncondensable gas in the quiescent zone has a volume at least half the volume of the vapor space in the heat extraction zone between the lowest interface level during operation with no articles being passed through the heat extraction zone and the highest interface level during operation with a maximum rated amount of articles being passed through the heat extraction zone, and the level of the path to the outside atmosphere above the quiescent zone is not above the level of the lowest other path to the outside atmosphere which is in free vapor communication with the heat extraction zone.

8. The method of claim 7 in which the quiescent body of noncondensable gas in the quiescent zone has a volume at least equal too the volume of the vapor space in the heat extraction zone between the lowest interface level during operation with no articles being passed through the heat extraction zone and the highest interface level during operation with a maximum rated amount of articles being passed through the heat extraction zone, and the distance from the level of the path to the outside atmosphere above the quiescent zone to the interface in the heat extraction zone is less than the distance from the level of the lowest other path to the outside atmosphere which is in free vapor communication with the heat extraction zone to the interface in the zone containing said lowest other path.

9. The method of claim 8 in which the path to the outside atmosphere above the quiescent zone is an outside opening, the area of said outside opening being at least $\frac{1}{100}$ of the horizontal cross-sectional area of the vapor space in the quiescent zone.

10. The method of claim 9 in which the articles are introduced into the heat extraction zone by being pumped in below the interface through a pipe which is not open to the atmosphere, and are removed from the vessel by passing them from the interface to the exit opening at a speed not in excess of 100 feet (30.48 meters) per minute.

11. The method of claim 9 in which the articles are introduced into the heat extraction zone by first introducing them into the vessel through an entrance opening which is in free vapor communication with the heat extraction zone, and then passing them downward from the entrance opening through the interface into the heat extraction zone, said articles moving from the entrance opening to the interface at a speed not in excess of 100 feet (30.48 meters) per minute, and are removed from the vessel by passing them from the interface to the exit opening at a speed not in excess of 100 feet (30.48 meters) per minute.

12. The method of claim 11 in which the articles are introduced into the heat extraction zone by passing them through an entrance passageway from the entrance opening to the interface at a speed of less than 50 feet (15.24 meters) per minute, and are removed from the vessel by passing them through an exit passageway from the interface to the exit opening at a speed of less than 50 feet (15.24 meters) per minute.

13. The method of claim 12 in which the articles are solid food and the freezant has a vapor density at its normal boiling point at least three times that of air at the same temperature.

14. The method of claim 13 in which the freezant is dichlorodifluoromethane.

15. Heat extraction apparatus which comprises:

(A) an open vessel, (B) a heat extraction zone within the vessel and containing liquid freezant having a normal atmospheric boiling point less than ambient temperature, (C) vapor condensing means in the heat extraction zone, the top of the vapor condensing means being below the level of all paths to the outside of the apparatus which are in free vapor communication with the heat extraction zone and the size of the vapor condensing means being such as to condense substantially all freezant vaporized in the heat extraction zone, (D) means for introducing articles into the heat extraction zone, (E) means for conveying the articles through the heat extraction zone, (F) means within the heat extraction zone for causing the articles to come in direct contact with the liquid freezant, thereby generating freezant vapor, substantially all of which is condensed by the vapor condensing means, (G) an exit opening for removing the articles from the vessel, and (H) means for conveying the articles from the heat extraction zone through the exit opening and out of the vessel.

16. The apparatus of claim 15 in which the means for causing the articles to come in direct contact with the liquid freezant provides interrupted contact.

17. The apparatus of claim 15 in which the top of the vapor condensing means is below the level of all outside openings which are in free vapor communication with the heat extraction zone.

18. The apparatus of claim 15 in which the bottom of the vapor condensing means in the heat extraction zone is above the level at which the articles come in direct contact with the liquid freezant.

19. The apparatus of claim 18 which also includes above the heat extraction zone a quiescent zone containing quiescing means which allows vapor movement in the quiescent zone in substantially only the vertical direction, and above the quiescent zone a path to the outside of the apparatus which is in free vapor communication with the heat extraction zone through the quiescent zone.

20. The apparatus of claim 19 in which the vapor space in the quiescent zone has a volume at least half the volume of the vapor space in the heat extraction zone between the levels of the top and bottom of the vapor condensing means, and the level of the path to the outside of the apparatus above the quiescent zone is not above the level of the lowest other path to the outside of the apparatus which is in free vapor communication with the heat extraction zone.

21. The apparatus of claim 19 in which the vapor space in the quiescent zone has a volume at least equal to the volume of the vapor space in the heat extraction zone between the levels of the top and bottom of the vapor condensing means, and the level of the path to the outside of the apparatus above the quiescent zone is not above the level of the lowest other path to the outside of the apparatus which is in free vapor communication with the heat extraction zone.

22. The apparatus of claim 21 in which the path to the outside of the apparatus above the quiescent zone is an outside opening, the area of said outside opening being at least $1/100$ of the horizontal cross-sectional area of the vapor space in the quiescent zone, and the quiescing means is a vertical standing honeycomb structure.

23. The apparatus of claim 22 in which the means for introducing the articles into the heat extraction zone is a pump communicating with the heat extraction zone through a pipe.

24. The apparatus of claim 22 in which the means for introducing the articles into the heat extraction zone is an entrance opening which is in free vapor communication with the heat extraction zone and means for conveying the articles downward from the entrance opening to the heat extraction zone.

25. The apparatus of claim 24 which also includes an entrance passageway from the entrance opening to the heat extraction zone, and an exit passageway from the heat extraction zone to the exit opening.

References Cited

UNITED STATES PATENTS

| | | | |
|---|---|---|---|
| 2,059,970 | 11/1936 | Robillard | 62—63 |
| 2,861,897 | 11/1958 | Hendrixson | 117—47 |
| 3,368,363 | 2/1968 | Alaburda et al. | 62—266 |

WILLIAM E. WAYNER, Primary Examiner

U.S. Cl. X.R.

34—242; 62—125, 266